United States Patent
Dautzenberg et al.

(10) Patent No.: US 12,441,849 B2
(45) Date of Patent: Oct. 14, 2025

(54) METHOD FOR PRODUCING A CROSSLINKED LIGNIN WITH A HIGHLY SPECIFIED SURFACE AREA, CROSSLINKED LIGNIN, AND TECHNICAL RUBBER ARTICLES OR TIRES COMPRISING CROSSLINKED LIGNIN

(71) Applicant: Suncoal Industries GmbH, Ludwigsfelde (DE)

(72) Inventors: Geertje Dautzenberg, Potsdam (DE); Jacob Podschun, Berlin (DE); Tobias Wittmann, Berlin (DE)

(73) Assignee: Suncoal Industries GmbH, Ludwigsfelde (DE)

( * ) Notice: Subject to any disclaimer, the term of this patent is extended or adjusted under 35 U.S.C. 154(b) by 493 days.

(21) Appl. No.: 18/004,745

(22) PCT Filed: Jul. 9, 2021

(86) PCT No.: PCT/DE2021/100602
§ 371 (c)(1),
(2) Date: Jan. 9, 2023

(87) PCT Pub. No.: WO2022/008008
PCT Pub. Date: Jan. 13, 2022

(65) Prior Publication Data
US 2023/0192966 A1  Jun. 22, 2023

(30) Foreign Application Priority Data

Jul. 10, 2020  (DE) .......................... 102020208683.4
Jan. 7, 2021  (DE) .......................... 102021100142.0

(51) Int. Cl.
C08L 97/00  (2006.01)
C08H 7/00  (2011.01)
C08J 3/14  (2006.01)
C08L 21/00  (2006.01)
B60C 1/00  (2006.01)

(52) U.S. Cl.
CPC .............. *C08H 6/00* (2013.01); *C08L 97/005* (2013.01); *B60C 1/00* (2013.01)

(58) Field of Classification Search
CPC .............. C08L 97/00; C08L 21/00; C08J 3/14
USPC .......................................................... 524/73
See application file for complete search history.

(56) References Cited

U.S. PATENT DOCUMENTS

2015/0344737 A1*  12/2015  Bode ..................... C08L 63/08
                                                              428/413
2018/0044482 A1*  2/2018  Wittmann ................ C08H 8/00
2018/0340074 A1*  11/2018  Wittmann ............. B60C 1/0025

FOREIGN PATENT DOCUMENTS

| CN | 102718995 A | 10/2012 |
| CN | 109777410 A | 5/2019 |
| DE | 102014215807 B3 | 12/2015 |
| WO | 2015018944 A1 | 2/2015 |
| WO | 2017085278 A1 | 5/2017 |

OTHER PUBLICATIONS

Translation of PCT International Search Report in PCT/DE2021/100602 dated Nov. 8, 2021, 3 pages.
Osterberg, Monika, et al., "Spherical lignin particles: a review on their sustainability and applications", Green Chemistry, GB, vol. 22, No. 9, May 11, 2020 (May 11, 2020), pp. 2712-2733.
Zou, Tao, et al., "Solvent-Resistant Lignin-Epoxy Hybrid Nanoparticles for Covalent Surface Modification and High-Strength Particulate Adhesives", ACS Nano, US, vol. 15, No. 3, Mar. 23, 2021 (Mar. 23, 2021), pp. 4811-4823.
Zou, Tao, et al., "Supporting information for Solvent-Resistant Lignin-Epoxy Hybrid Nanopar—tides for Covalent Surface Modification and High-Strength Particulate Adhesives", Feb. 17, 2021 (Feb. 17, 2021). pp. 1-18.
Zhou, Wenjing, "Method for producing a cross-linked lignin in particulate form", Zhejiang University of Technology, Master's Thesis, Online Publishing Period: 2016, No. 4.

* cited by examiner

*Primary Examiner* — Deve V Hall
(74) *Attorney, Agent, or Firm* — SERVILLA WHITNEY LLC

(57) ABSTRACT

The invention relates to a method for producing a crosslinked lignin in particle form using a hydrothermal treatment of a liquid, which is made of black liquor, contains lignin and a crosslinker or a precursor thereof, and has an electrical activity ranging from more than 15 mS/cm, preferably more than 25 mS/cm, to 400 mS/cm, and to the crosslinked lignin produced using the aforementioned method. The invention additionally relates to crosslinked lignin particles which have a glass transition temperature Tg of at least 160° C. or no glass transition temperature and an STSA surface area of at least 10 m²/g and to rubber articles, in particular technical rubber articles or tires, which comprise crosslinked lignin particles as a filler.

28 Claims, No Drawings

METHOD FOR PRODUCING A CROSSLINKED LIGNIN WITH A HIGHLY SPECIFIED SURFACE AREA, CROSSLINKED LIGNIN, AND TECHNICAL RUBBER ARTICLES OR TIRES COMPRISING CROSSLINKED LIGNIN

CROSS-REFERENCE TO RELATED APPLICATIONS

This application is the National Stage entry of PCT/DE2021/100602, filed on Jul. 9, 2021, which claims priority to Germany Appln. Ser. No. 10 2020 208 683.4, filed on Jul. 10, 2020 and Germany Appln. Ser. No. 10 2021 100 142.0, filed on Jan. 7, 2021, which are incorporated herein by reference in their entireties.

STATE OF THE ART

Lignin from hardwood, softwood and annual plants exhibits high solubility in many polar and alkaline media after extraction/recovery in the form of, for example, kraft lignin, lignosulfonate or hydrolysis lignin. Lignins exhibit, inter alia, a glass transition at temperatures of mostly 80° C. to 150° C. The microscopic structure of lignin particles is changed by softening already at low temperatures. Therefore, lignin-containing materials normally are not stable, but change their properties at high temperatures. Moreover, the solubility of lignin in polar solvents such as dioxane and acetone containing, e.g., 10% water or in an alkaline medium is usually >95% (Sameni et al., BioResources, 2017, 12, 1548-1565; Podschun et al., European Polymer Journal, 2015, 67, 1-11). Due to these and other properties, lignin can be used only to a limited extent in material applications (DE102013002574A1).

Hereinafter, lignin is to be understood as the sum of Klason lignin and acid-soluble lignin. The dry mass can in addition contain other organic and inorganic constituents.

In order to overcome these disadvantages, it has been proposed to produce a stabilized lignin by hydrothermal carbonization or hydrothermal treatment that is characterized by a softening temperature (glass transition temperature) of more than 200° C. (WO2015018944A1). By adjusting the pH value, it is possible to obtain a stabilized lignin with a defined particle size distribution (WO2015018944A1).

Improved methods use lignin as a raw material for the production of particulate carbon materials that can find application for example as functional fillers in elastomers (WO2017085278A1). An essential quality parameter for functional fillers is the external surface area of the particulate carbon material, which is determined through measurement of a statistical thickness surface area (STSA). Such methods make use of hydrothermal carbonization of a lignin-containing liquid, usually at temperatures between 150° C. and 250° C. Because of the high reactivity of the lignin at such temperatures, a fine tuning of pH value, ionic strength and lignin content of the lignin-containing liquid as well as the temperature and duration of the hydrothermal carbonization is necessary in order to achieve high specific surface areas. This is achieved by adjusting the pH value to within the alkaline range, usually to values above 7.

For such particulate carbon materials, this opens the possibility for applications in materials that differ from those of the respective starting lignins. Because of the lower solubility of less than 40% and a specific surface area of more than 5 m$^2$/g and less than 200 m$^2$/g, they can thus be used for example as reinforcing fillers in elastomers and completely or partially substitute carbon blacks.

The disadvantage of these methods is the low yield which is generally between 40% and 60%. A further disadvantage of these methods is the high effort for adapting the properties of the lignin-containing liquid (pH value, ionic strength, lignin content) to the process parameters of the hydrothermal carbonization (temperature and residence time) in order to achieve higher specific surface areas. In order to achieve surface areas in the range of more than 5 m$^2$/g, the lignin-containing liquid must have an electrical conductivity of less than 25 mS/cm. Due to the required sensitivity of the abovementioned tuning, it is more feasible to achieve surface areas above 40 m$^2$/g in the laboratory than on an industrial scale. It can be assumed that such adjustment with the aim to increase the specific surface area will lead to a reduction in yield.

A known method for increasing the yield of solid matter and augmenting lignin conversion for the production of fuels from a suspension of dried black liquor and water by hydrothermal carbonization at temperatures between 220° C. and 280° C. is the addition of formaldehyde [Bioressource Technologie 2012, 110715-718, Kang et al.]. Kang et al. suggest to add 37 g of formaldehyde per 100 g of dry lignin at a solid matter concentration of 20% (100 ml of a 2.8% formaldehyde solution per 25 g dry mass obtained by drying black liquor with a lignin content of 30% relative to the dry mass). This can increase the conversion into solid matter of the lignin contained in the black liquor from 60-80% to values between 90% and 100%, wherein the highest values are achieved at temperatures between 220° C. and 250° C. This prior art attributes the increase in yield to the polymerization between formaldehyde, the solid matter in the black liquor, and the carbonization products formed from this solid matter (page 716, final paragraph).

Disadvantages of this Prior Art the high specific dosing of formaldehyde of 37 g per 100 g of lignin,
the high ash contents of the dry mass used as well as of the products produced therefrom,
the polymerization between formaldehyde, the solid in the black liquor as well as the carbonization products formed from this solid, and
the associated restriction of the use of the product to fuel applications (cf. Kang et al.)

SHORT DESCRIPTION OF THE INVENTION

The aim of the present invention is to describe a method that leads to a cross-linked lignin suitable for material applications while achieving high yields.

It is an object of the invention to specify a method that
reduces the solubility of the lignin in alkaline and/or polar media,
increases or eliminates the glass transition temperature of the lignin,
results in a cross-linked or stabilized lignin with advantageous particle properties, and
has a high yield.

The object was in particular to provide a method for the production of lignin particles with a high specific surface area, e.g., a BET surface area >20 m$^2$/g, preferably >30 m$^2$/g, or a corresponding STSA surface area, wherein the method allows a simplified processing of black liquor as starting material.

Surprisingly, the object could be solved by a method for producing a cross-linked lignin in particulate form dissolved, wherein the method comprises the following steps:
a) providing a black liquor with a dry matter content of 5 to 50% by weight,
b) producing a liquid that contains lignin and at least one cross-linking agent and/or one precursor of the cross-linking agent and having the following properties:
  a dry matter content of 5-25% by weight,
  an ash content relative to the dry mass of 10-45% by weight
    a pH value of more than 6.5 and less than 10, preferably more than 7 and less than 10, more preferably more than 7.5 and less than 10,
    an electrical conductivity of more than 15 mS/cm to 400 mS/cm,
  from the black liquor, wherein the production of the liquid comprises
    i) mixing the black liquor with an acid and/or an acidic gas in order to lower the pH value, and
    ii) mixing the black liquor or a product derived therefrom with the at least one cross-linking agent and/or the precursor of the cross-linking agent, and
    iii) optionally adding a liquid in order to reduce the dry matter content,
c) hydrothermal treatment of the liquid produced in step b) that contains lignin and at least one cross-linking agent and/or one precursor of the cross-linking agent at a temperature in the range from 150° C. to 270° C. with formation of cross-linked lignin particles in the liquid, and
d) separating the liquid from the cross-linked lignin particles formed in step c), and
e) washing the separated cross-linked lignin particles with a washing medium.

Preferably, the liquid separated in step d), and optionally the used washing medium obtained in step e), are fed into a reprocessing plant in order to recover liquor from the constituents and/or to recover energy.

Another object of the present invention was to provide lignin, in particular lignin particles, that are better cross-linked, in particular are better stabilized, and that are particularly suited as improved, cross-linked, stabilized filler for rubber articles, in particular technical rubber articles or tires.

The incorporation of the lignin particles according to the invention into the rubber articles based on natural and synthetic rubbers, such as technical rubber articles or tires, as a filler is intended to improve the properties of the rubber article, in particular special properties such as
  specific elongation under tension
  low loss factor during dynamic deformation
  high dynamic stiffness
  low compression set in order to improve the sealing function
  good electrical isolation behavior due to the particle morphology
  low component weight
  high stiffness with low deformations
  minimization of polycyclic aromatic compounds In this application, all percentages given refer to weight, unless stated otherwise. As usual, a liquid can also be for example a solution or a suspension.

DETAILED DESCRIPTION OF THE INVENTION

Black Liquor

According to step a) of the method according to the invention, a black liquor is provided. In particular, black liquor is a lignin-containing liquid that results as waste liquor from an alkaline fractioning process for woody biomass, e.g., in a KRAFT process, in pulp production or in a sodium hydroxide process. The pH value of the black liquor is in the alkaline range, usually at a pH value of 12-14. Black liquor can contain further organic or inorganic constituents in addition to lignin. Typical for black liquor is the lignin proportion in the organic dry mass of over 50%, in particular over 60% or even over 70%, which is therefore significantly higher than the lignin proportion in woody biomass that lies at 15%-35%. In the following, lignin content is to be understood as the sum of Klason lignin and acid-soluble lignin.

The black liquor resulting as waste liquor from alkaline pulping in the pulp production is concentrated further in evaporating plants. For the method according to the invention, the black liquor can be taken from or provided by an evaporating plant.

The black liquor used in the method specifically has a dry matter content of 5 to 50% by weight, preferably 5 to 40% by weight, more preferably 10 to 40% by weight, with respect to the total weight of the black liquor.

The method according to the invention comprises, as step b), the production of a liquid that contains lignin and at least one cross-linking agent and/or one precursor of the cross-linking agent from the black liquor. The properties of the liquid obtained in step b) will be described hereinafter.

The production of the liquid from the black liquor according to step b) comprises at least the following steps
  i) mixing the black liquor with an acid and/or an acidic gas in order to lower the pH value, and
  ii) mixing the black liquor or a product derived therefrom with the at least one cross-linking agent and/or the precursor of the cross-linking agent, and
  iii) optionally adding a liquid in order to reduce the dry matter content, The product derived from the black liquor can be a product obtained by reprocessing the black liquor, e.g., the solid lignin raw material that can be obtained according to the variant b2) described hereinafter. Suitable as the liquid for lowering the dry matter content are all common inorganic solvents such as water, or organic solvents such as alcohol, with water being preferred. Suitable embodiments for the acid and/or the acidic gas are the same as those hereinafter described for the specific variants b1) and b2). Suitable embodiments for the cross-linking agent and/or the precursor of the cross-linking agent are also described hereinafter.

The formation of the liquid from the black liquor according to step b) can be carried out preferably via a step b1) or via an alternative step b2).

In the alternative embodiment b1), a liquid that contains lignin and at least one cross-linking agent and/or one precursor of the cross-linking agent is obtained from the black liquor by mixing the black liquor with i) an acid and/or an acidic gas in order to lower the pH value, and ii) with at least one cross-linking agent and/or one precursor of the cross-linking agent.

The acid for the admixture in step b1) can be an inorganic acid such as sulfuric acid or an organic acid such as acetic acid or formic acid, wherein the acid can be added as a technical grade acid with a water content of less than 10% by weight, preferably less than 5% by weight, or as an aqueous acid. The acidic gas for the admixture in step b1)

can be selected, e.g., from $CO_2$, $H_2S$ or a mixture of $CO_2$ and $H_2S$. Conveniently, the acidic gas is simply introduced into the black liquor.

The order of adding the individual components to one another in order to obtain the liquid containing lignin and cross-linking agent and/or its precursor is not restricted. The components can be mixed with each other simultaneously, sequentially and/or in portions. The liquid can also be moved for proper mixing, e.g., by stirring or recirculating the liquid.

In this variant of the method, the dry matter content of the black liquor provided in step a) is preferably higher than 10% and preferably lower than 30%, further preferably lower than 25%. If a black liquor with a dry matter content above the preferred range is provided in step a), then a liquid can further be added in step b1) in order to adjust the dry matter content of the liquid.

In the alternative embodiment b2), a liquid that contains lignin and at least one cross-linking agent and/or one precursor of the cross-linking agent is produced from the black liquor by
mixing the black liquor with an acid or an acidic gas for lowering the pH value with formation of a solid lignin raw material in the black liquor;
separating the solid lignin raw material from the black liquor;
mixing the separated solid lignin raw material with i) a liquid and ii) with the at least one cross-linking agent and/or the precursor of the cross-linking agent,
wherein optionally an acid and/or an acidic gas is additionally admixed for further lowering of the pH value.

The acid for the admixture in step b2) that is used for the admixture to the black liquor and/or for the optional further lowering of the pH can be, e.g., an inorganic acid, such as sulfuric acid, or an organic acid, such as acetic acid or formic acid, wherein the acid can be added as a technical grade acid with a water content of less than 10% by weight, preferably less than 5% by weight, or as an aqueous acid. The acidic gas for the admixture in step b2) that is used for the admixture to the black liquor and/or for the optional further lowering of the pH can be selected, e.g., from $CO_2$, $H_2S$ or a mixture of $CO_2$ and $H_2S$. Conveniently, the acidic gas is simply introduced into the black liquor or into the liquid for lowering the pH.

By adding the acid or by introducing the acidic gas into the black liquor, the pH value of the black liquor is lowered, preferably to a pH in the range from 9.5 to 10.5. Thereby, a solid lignin raw material is formed or precipitated in the black liquor. The precipitated solid lignin raw material is separated, preferably by filtration, from the black liquor or its liquid constituents. The dry mass of the separated solid lignin raw material may contain further organic and/or inorganic constituents in addition to lignin. The amount of lignin in the dry matter is, e.g., at least 60%, preferably at least 70%. However, the amount of lignin in the dry matter is, e.g., at maximum 90%.

The separated solid lignin raw material is mixed with i) a liquid and ii) with the at least one cross-linking agent and/or the precursor of the cross-linking agent, wherein optionally an acid and/or an acidic gas is additionally admixed for further lowering of the pH value. In this way, a liquid that contains lignin and at least one cross-linking agent and/or one precursor of the cross-linking agent is formed from the black liquor.

The order of adding the individual components to one another in order to obtain the liquid containing lignin and cross-linking agent and/or its precursor is not restricted. The components can be mixed with each other simultaneously, sequentially and/or in portions. The liquid can also be moved for proper mixing, e.g., by stirring or recirculating the liquid.

The liquid that is added to the separated solid lignin raw material can be an inorganic solvent such as, e.g., water, and/or an organic solvent, such as, e.g., an alcohol, such as ethanol, wherein the liquid preferably is water.

In an optional and preferred embodiment of variant b2), an acid and/or an acidic gas is admixed in addition to the added liquid, such as, e.g., water, for further lowering of the pH value. If this optional step is carried out, the liquid, such as water, and the acid, such as sulfuric acid or acetic acid, and/or the acidic gas may be mixed with the solid lignin raw material separately. It is however also possible to mix the liquid, such as water, with the acid, such as sulfuric acid or acetic acid, or the acidic gas first, and to mix the mixture then with the solid lignin raw material, or to add a partial amount of the liquid, such as water, as such to the solid lignin raw material, and to admix another partial amount of the liquid, such as water, mixed with the acid, such as sulfuric acid or acetic acid, or the acidic gas, separately as an aqueous acid.

In a particularly preferably embodiment, the solid lignin raw material is recovered from black liquor, e.g., as a first partial step in the LignoBoost process. In this process, lignin is precipitated by acidification by means of $CO_2$ (introduction of $CO_2$ into the black liquor). In the following, precipitation shall specifically mean a predominant conversion of more than 35%, preferably of more than 40%, particularly preferably of more than 45% of the lignin dissolved in the black liquor. The precipitated lignin may be filtered off and the lignin-containing solid can be recovered in this way.

By introducing $CO_2$ into the black liquor, a pH value of 9.5-10.5 is reached in the black liquor which is sufficient for the precipitation of lignin.

Accordingly, the filtrate of the dewatering of the $CO_2$ lignin is alkaline and may simply be returned into the liquor recovery of a pulp mill as an option. The ash (approx. 15-25%) contained in the $CO_2$ lignin that is present after step c) in the form of dissolved ash may be separated together with the liquid to a large extent from the cross-linked lignin particles and then returned to the liquor recovery of the pulp mill as an alkaline filtrate. Here, dissolved ash is to be understood specifically as the inorganic salts dissolved in the liquid.

In contrast, the filtrate from an acidification by $H_2SO_4$ as a further partial step of the LignoBoost process acidic and has to be neutralized after returning to the pulp mill. Furthermore, any introduced sulfur has to be separated in the pulp mill. Also, the recovery of cross-linked lignin particles from lignin obtained from a LigninBoost process requires the addition of NaOH in order to raise the pH value from 2 to pH>7.

Thus, the use of a lignin-containing solid matter precipitated from black liquor in the presence of $CO_2$ as the starting material for the present method is efficient in comparison to other lignin solid matter, such as, e.g., lignin from the LignoBoost process. Surprisingly, it has turned out that such raw material is suitable for the production of cross-linked lignin particles if a cross-linking agent is added in step b) and the inventive properties of the liquid, that contains lignin and at least one cross-linking agent and/or one precursor of the cross-linking agent, are adjusted.

In the following, further details about the liquid that is obtained from black liquor in step b) and that contains lignin and at least one cross-linking agent and/or one precursor of the cross-linking agent, are given, the details applying in the same way both to the formation of the liquid via step b1) and via the alternative step b2), unless expressly stated otherwise.

As already stated above, the acid for the admixture in step b) (more generally step i) or b1) or b2)) can be, e.g., an inorganic acid, such as sulfuric acid, or an organic acid, such as acetic acid or formic acid. The acidic gas for the admixture in step b) (b1) or b2)) can be selected, e.g., from $CO_2$, $H_2S$ or a mixture of $CO_2$ and $H_2S$.

The lignin in the liquid obtained in step b) comprises lignin that can be determined as Klason lignin and acid-soluble lignin. Klason lignin describes, according to Tappi T 222 om-02 (https://www.tappi.org/content/SARG/T222.pdf), an analytical measurement variable after treatment in 72% $H_2SO_4$ and is the product to be quantified in this analytical method.

The lignin presents functional groups through which cross-linking is possible. The lignin can present, e.g., phenolic aromatic compounds, aromatic and aliphatic hydroxyl groups and/or carboxyl groups as cross-linkable units that are suitable for the reaction with a cross-linking agent.

It is preferred that in the liquid produced in step b), at least a part of the lignin is already dissolved in the liquid, and/or during the heating of the liquid produced in step b) to the temperature for the hydrothermal treatment, at least a part of the lignin is dissolved in the liquid. The proportion of dissolved lignin is typically increased by heating of the liquid. Such heating is required for the hydrothermal treatment of the liquid anyway.

In addition to the dissolved lignin, undissolved lignin can also be present in dispersed form in the liquid obtained in step b). Thus, it is not necessary for the present method that the whole lignin is present in the liquid in dissolved form. Advantageously, however, more than 50%, particularly preferably more than 60%, moreover preferably more than 70%, particularly preferably more than 80%, in particular more than 90%, in moreover particularly preferably more than 95% of the lignin are dissolved in the liquid, before the liquid is subjected to hydrothermal treatment in step c).

Furthermore, in process step b) (more generally step ii) or b1) or b2)) at least one cross-linking agent and/or one precursor of the cross-linking agent is admixed so that the liquid obtained in step b) contains at least one cross-linking agent and/or one precursor thereof. By precursor of the cross-linking agent is understood here a compound that is no cross-linking agent itself, but forms the cross-linking agent in situ before or during the hydrothermal treatment in step c), e.g., by a thermal decomposition reaction. The following details of the cross-linking agent also apply to cross-linking agents formed in situ from a precursor, where applicable.

The cross-linking agent has at least one functional group that can react with the cross-linkable groups of the lignin. The cross-linking agent preferably has at least one functional group selected from aldehyde, carboxylic acid anhydride, epoxide, hydroxyl and isocyanate groups, or a combination thereof.

If the cross-linking agent has a functional group that can react with two cross-linkable groups of the lignin during the reaction, such as an aldehyde, acid anhydride or epoxide group, one such functional group is sufficient. Otherwise, the cross-linking agent has at least two functional groups, such as, e.g., hydroxyl or isocyanate groups that can react with the cross-linkable groups of the lignin.

In a particularly preferred embodiment, the at least one cross-linking agent is selected from at least one aldehyde, epoxide, acid anhydride, polyisocyanate or polyol, wherein the at least one cross-linking agent preferably is selected from aldehydes, particularly preferably formaldehyde, furfural or sugar aldehydes. A polyisocyanate is a compound with at least two isocyanate groups, wherein a diisocyanate or triisocyanate is preferred. A polyol is a compound with at least two hydroxyl groups, wherein a diol or triol is preferred.

When using bifunctional cross-linking agents, two moles of cross-linkable units are available per mole of the bifunctional cross-linking agent. Accordingly, when using trifunctional cross-linking agents, three moles of cross-linkable units are available per mole of the trifunctional cross-linking agent, and so on. It should be noted here that despite the multiple functionalities of the cross-linking agents, often only a part of the available groups reacts, since the reactivity decreases as the groups react off, partly due to steric hindrance and partly due to the shifting of charges.

In the following statements, a cross-linkable unit of the cross-linking agent refers to a unit that can react with a cross-linkable unit of the lignin. A functional group that is able to react with two cross-linkable groups of the lignin during reaction, such as, e.g., an aldehyde, acid anhydride or epoxide group, counts as two cross-linkable units accordingly.

Preferably, the dosing of the cross-linking agent in the liquid obtained in step b) is carried out such that a maximum of 4 mol, preferably a maximum of 3 mol, further preferably a maximum of 2.5 mol, particularly preferably a maximum of 2 mol, moreover preferably a maximum of 1.75 mol, in particular a maximum of 1.5 mol, of cross-linkable units in the cross-linking agent are used per mole of units that are cross-linkable therewith in the lignin used.

Preferably, the dosing of the cross-linking agent in the liquid obtained in step b) is carried out such that at least 0.2 mol, preferably at least 0.5 mol, further preferably at least 0.75 mol, further preferably at least 1 mol, particularly preferably at least 1.1 mol, in particular at least 1.15 mol, of cross-linkable units in the cross-linking agent are present per mole of units that are cross-linkable therewith in the lignin used. Preferably, the dosing of the cross-linking agent in the liquid obtained in step lies in the range from 0.2 mol to 4 mol, more preferably of 0.5 mol to 3 mol, particularly preferably of 1 to 2 mol cross-linkable units of the cross-linking agent per mole of units that are cross-linkable therewith in the lignin used.

Cross-linking agents can react at phenolic rings in free ortho and/or para position in the lignin (phenolic guaiacyl groups and p-hydroxyphenyl groups). Suitable cross-linking agents for the reaction at free ortho and para positions of phenolic rings are fore example aldehydes such as formaldehyde, furfural, 5-hydroxymethyl furfural (5-HMF), hydroxybenzaldehyde, vanillin, syringaldehyde, piperonal, glyoxal, glutaraldehyde or sugar aldehydes. Preferred cross-linking agents for reaction at phenolic rings are formaldehyde, furfural, and sugar aldehydes (ethanals/propanals) such as for example glyceraldehyde and glycolaldehyde.

In addition, cross-linking agents may react with aromatic and aliphatic OH groups (phenolic guaiacyl groups, p-hydroxyphenyl groups, syringyl groups) in the lignin. For this purpose, for example bifunctional and also multifunctional compounds having epoxide groups, such as glycidyl ethers, isocyanate groups, such as diisocyanate or oligomeric diisocyanate, or acid anhydrides may preferably find application. Preferred cross-linking agents for reaction at aromatic and aliphatic OH groups are polyisocyanates, in particular diisocyanates or triisocyanates, and acid anhydrides.

Moreover, cross-linking agents can also react with carboxyl groups. For this purpose, for example diols and triols may find application. Preferred cross-linking agents for reaction with carboxyl groups are diols.

In addition, cross-linking agents can react with each of phenolic rings, aromatic and aliphatic OH groups, and carboxyl groups. For this purpose, e.g., bifunctional and also multifunctional compounds having at least two of the above-mentioned cross-linking functional groups may be used.

When using cross-linking agents that react with the phenolic ring, the cross-linkable units in the lignin employed are understood as meaning phenolic guaiacyl groups and p-hydroxyphenyl groups. The concentration of cross-linkable units (mmol/g) is determined for example by means of 31P NMR spectroscopy (Podschun et al., European Polymer Journal, 2015, 67, 1-11), wherein guaiacyl groups contain one cross-linkable unit and p-hydroxyphenyl groups contain two cross-linkable units.

When using cross-linking agents that react with aromatic and aliphatic OH groups, the cross-linkable units in the lignin employed are understood as meaning all aromatic and aliphatic OH groups. The concentration of cross-linkable units (mmol/g) is determined for example by means of 31P NMR spectroscopy, wherein one OH group corresponds to one cross-linkable unit.

When using cross-linking agents that react with carboxyl groups, the cross-linkable units in the lignin employed are understood as meaning all carboxyl groups. The concentration of cross-linkable units (mmol/g) is determined for example by means of 31P NMR spectroscopy, wherein one carboxyl group corresponds to one cross-linkable unit.

Preferably, the amount of cross-linking agent in the liquid obtained in step b) lies at a maximum of 35 g/100 g of lignin, preferably at a maximum of 30 g/100 g of lignin, particularly preferably at a maximum of 25 g/100 g of lignin.

Preferably, the amount of cross-linking agent, preferably formaldehyde, in the liquid obtained in step b) lies at a maximum of 25 g/100 g of lignin, preferably at a maximum of 20 g/100 g of lignin, particularly preferably at a maximum of 15 g/100 g of lignin, in particular at a maximum of 12 g/100 g of lignin. Therefore, the amount of added cross-linking agent, preferably formaldehyde, may lie in a range from 1 to 20 g/100 g of lignin, preferably from 5 to 15 g/100 g of lignin, particularly preferably from 6 to 12 g/100 g of lignin. There is also the possibility to add instead, in whole or in part, precursors of cross-linking agents, such as formaldehyde or other aldehydes, to the liquid, from which the actual cross-linking agent is formed in situ.

By adjusting the amount of cross-linking agent as mentioned above, the specific surface area of the cross-linked lignin particles obtained can be significantly increased.

Advantageously, as an alternative or in addition to the cross-linking agent, a precursor of the cross-linking agent can be used which produces the cross-linking agent in situ before and/or during the hydrothermal treatment. The advantage of producing a cross-linking agent in situ is that the amount of cross-linking agent added can be reduced or eliminated altogether.

Advantageous examples of suitable precursors of the cross-linking agent are carbohydrates, preferably cellulose, hemicelluloses or glucose, or lignin, each of which may be present dispersed or dissolved in the liquid. When carbohydrates, preferably cellulose, hemicelluloses or glucose, are used as precursors, an aldehyde, preferably glyceraldehyde or glycolaldehyde, can be produced from them in situ in the method according to the invention, which then acts as a cross-linking agent. When lignin is used as a precursor, in particular an aldehyde, preferably methandiol or glycolaldehyde, can be produced from it in situ in the method according to the invention, which then acts as a cross-linking agent.

The proportion of lignin, relative to the total mass of the liquid obtained in step b) that contains the lignin, advantageously is between 3% and 25%, preferably less than 20%, particularly preferably less than 18%, relative to the weight of the liquid obtained in step b) without the cross-linking agent and/or the precursor of the cross-linking agent. In a preferred embodiment, the amount of lignin in the liquid obtained in step b) ranges from 3 to 25% by weight, preferably from 7 to 18% by weight, relative to the weight of the liquid obtained in step b) without the cross-linking agent and/or the precursor of the cross-linking agent.

Dry Matter Content and Ash Content of the Liquid Obtained in Step b)

The dry matter content of the liquid obtained in step b) lies in the range from 5 to 25% by weight. The ash content of the liquid obtained in step b), relative to the dry mass, lies in the range from 10 to 45% by weight.

The dry matter content may be determined by thermogravimetry with the temperature being adjusted to 105° C. Suitable equipment is for example the Sartorius MA 35 moisture analyzer. The moisture or water content normally measured must then be recomputed to give the dry matter content, e.g., dry matter content=100−water content (% by weight, resp.).

The ash content is determined according to DIN 51719, with the temperature of the ashing being set to 915° C.

pH Value of the Liquid Obtained in Step b)

The pH value of the liquid obtained in step b) (or b1) or b2)) that contains lignin and at least one cross-linking agent and/or one precursor of the cross-linking agent lies in the range from more than 6.5 to below 10, preferably from more than 7 to below 10 and more preferably from more than 7.5 to below 10, preferably 8 to 9.5, particularly preferably 8 to 9. Experiments have shown that for achieving a high specific surface a pH value of about 8.5 to 9 is most suitable, whereas at pH values below 6.5 or below 7.5 or significantly above 9 the achievable BET and STSA surface areas are clearly reduced.

These pH values are adjusted by lowering the pH by adding the acid and/or the acidic gas to the black liquor in step b1) or by adding acid and/or acidic gas to the black liquor and optionally admixing further acid and/or the further acidic gas to the separated solid lignin raw material in step b2).

The pH value of the liquid obtained in step b) can be determined directly after the production of the liquid according to step b) and refers in particular to the pH before the hydrothermal treatment according to step c). The pH value is determined at room temperature (23° C.).

In a preferred embodiment, an acid or an acidic gas is admixed to the separated solid lignin raw material in step b2) in order to further lower the pH. If another acid is added, the amount of the acid, e.g., sulfuric acid or acetic acid or formic acid that is admixed for the formation of the liquid produced in step b) is preferably in the range from 2 to 15 g, preferably 5 to 12 g, per 100 g of lignin in the liquid.

Electrical Conductivity of the Liquid Obtained in Step b)

The liquid produced according to b1) or b2) in step b) that contains lignin and at least one cross-linking agent and/or one precursor of the cross-linking agent exhibits an electrical conductivity in a range from more than 15 mS/cm to 400 mS/cm. Despite the high electrical conductivity of the liquid, the method according to the invention allows for the production of lignin particles with high specific surface area.

In a preferred embodiment, the liquid obtained in step b) exhibits an electrical conductivity of more than 25 mS/cm and/or of at most 100 mS/cm, preferably at most 80 mS/cm, more preferably at most 60 mS/cm, particularly preferably at most 40 mS/cm. The electrical conductivity of the liquid obtained in step b) can preferably lie at more than 25 mS/cm to 200 mS/cm, preferably in the range from more than 25 mS/cm to 80 mS/cm or 25 mS/cm to 60 mS/cm or 25 to 40 mS/cm. It can however also be, e.g., in the range from 30 mS/cm to 80 mS/cm or 40 to 60 mS/cm.

Herein, the electrical conductivity serves as a measure for the ion content of the liquid. It refers to the electrical conductivity of the liquid at 23° C. and can be determined by common conductivity meters, e.g., a pH meter designed for that purpose. The electrical conductivity was determined with the measuring probe of the PCE-PH D1 apparatus (pH meter from PCE Instruments) (determined as conductivity value at 20° C. to 25° C.). The electrical conductivity of the liquid obtained in step b) can be determined directly after the production of the liquid in step b), in particular before the hydrothermal treatment.

Hydrothermal Treatment

The method according to the invention further comprises as step c) the hydrothermal treatment of the liquid obtained in step b) that contains lignin and/or at least one cross-linking agent and/or one precursor of the cross-linking agent, at a temperature in the range from 150° C. to 270° C. with formation of cross-linked lignin particles in the liquid.

The temperature of the hydrothermal treatment is advantageously lower than 270° C., preferably lower than 260° C., further preferably lower than 250° C., in some instances lower than 240° C.

In an advantageous embodiment, the temperature of the hydrothermal treatment is higher than 150° C., preferably at least 160° C., further preferably at least 170° C., preferably higher than 180° C., moreover preferably higher than 190° C., in particular higher than 200° C., in some instances higher than 210° C.

In a preferred embodiment, the hydrothermal treatment is carried out at a temperature in the range from 180° C. to 250° C., preferably 210° C. to 250° C.

Advantageously, the duration of the hydrothermal treatment is at least 10 minutes, further preferably at least 30 minutes, particularly preferably at least 45 minutes, even more preferably at least 90 minutes, and/or less than 600 minutes, preferably less than 480 minutes, particularly preferably less than 450 minutes, further preferably less than 300 minutes, in particular less than 180 minutes, in some instances less than 150 minutes.

The hydrothermal treatment is carried out at positive pressure. The hydrothermal treatment is preferably carried out in a pressure-tight vessel, in particular in a reactor or autoclave. The pressure during the hydrothermal treatment is preferably at least 1 bar, further preferably at least 2 bar and preferably at maximum 10 bar above the saturated steam pressure of the liquid containing the lignin.

During hydrothermal treatment, the liquid may also be moved for proper mixing, e.g., by stirring or recirculating the liquid.

During the hydrothermal treatment, the cross-linking of lignin is carried out by means of the cross-linking agent with formation of cross-linked lignin particles in the liquid. A partial reaction of lignin with the cross-linking agent may also occur already before the hydrothermal treatment during heating of the liquid. The cross-linked lignin particles obtained by the hydrothermal treatment are stabilized lignin particles and are described in detail below.

Separation of the Cross-Linked Lignin Particles

The method according to the invention further comprises the step d), wherein the cross-linked lignin particles formed in step c) are separated from the liquid.

For the separation of the formed cross-linked lignin particles from the liquid, all common solid-liquid separation methods may be employed. Preferably, the liquid is separated from the particles by filtration or centrifugation. When using filtration or centrifugation, a dry matter content of more than 15%, preferably more than 20%, further preferably more than 25% particularly preferably more than 30% and preferably less than 60%, preferably less than 55%, further preferably less than 50%, particularly preferably less than 45%, moreover preferably less than 40% is preferably achieved. Another possibility for separating the lignin particles is the evaporation of the liquid, e.g., at an elevated temperature and/or reduced pressure.

Washing of the Cross-Linked Lignin Particles

The method according to the invention further comprises the step e), wherein the cross-linked lignin particles separated in step d) are washed with a washing medium or a washing liquid. The separated cross-linked lignin particles may be washed once or several times with the washing medium. In a preferred embodiment, used washing medium is returned to an evaporating plant for black liquor.

In a particularly advantageous embodiment, the pH value of the washing medium used is higher than 4, preferably higher than 6, and lower than 10, preferably lower than 9. Suitable as the washing medium is, e.g., water, such as tap water or preferably demineralized water, optionally also containing additives, e.g., an acid or a base.

By means of washing, it is possible to remove inorganic compounds from the particles, so that the ash content of the cross-linked lignin particles is reduced notably. This helps to improve the properties of the particles.

The washed lignin particles are typically dried, wherein at least a part of the remaining liquid is removed preferably by its evaporation, e.g., by heating and/or pressure reduction. It is preferred to obtain dried or dry cross-linked lignin particles as the final product. Preferably, the dry matter content is more than 90%, further preferably more than 92%, in particular more than 95%. In the present invention, dry particles are understood to be particles with a dry matter content of more than 90%, further preferably of more than 92%, in particular of more than 95%.

Preferably, the liquid separated in step d), and optionally the used washing medium obtained in step e), are fed into a reprocessing plant in order to recover liquor from the constituents and/or to recover energy.

Optional Returning of the Liquid Separated in Step d) and/or of the Used Washing Medium from Step e) to Recover Liquor and/or Energy The liquid separated in step d) and optionally the used washing medium obtained in step e) are optionally and preferably returned to a reprocessing plant, in particular an evaporating plant for black liquor, in order to recover liquor and/or energy. The constituents come from the black liquor used. An evaporation plant for black liquor is part of the reprocessing plant. Commonly, such a reprocessing plant comprises, in addition to the evaporating plant, a liquor recovery boiler and a causticizing plant.

In a preferred embodiment, the black liquor provided in step a) is taken from an evaporating plant for black liquor, and the liquid separated in step d) and optionally the used washing medium obtained in step e) are returned to the evaporating plant at a position that is downstream of the extraction point of the black liquor, so that no circulation can occur.

Heating of the Liquid Obtained in Step b) and Optional Intermediate Treatment

The heating rate for the liquid obtained in step b) that contains lignin and at least one cross-linking agent and/or one precursor thereof in order to reach the temperature for the hydrothermal treatment and/or the optionally conducted intermediate treatment is preferably less than 15 Kelvin per minute, further preferably less than 10 Kelvin per minute, particularly preferably less than 5 Kelvin per minute It may be appropriate to hold the liquid obtained in step b) at a lower temperature for a certain period before the hydrothermal treatment; this will be referred to as intermediate treatment hereinafter.

In this optional intermediate treatment, the liquid produced in step b) is held, before the hydrothermal treatment conducted in step c), at a temperature in the range from 50° C. to below 150° C., more preferably 60° C. to 130° C., particularly preferably 70° C. to below 100° C., for a duration of at least 5 minutes, preferably at least 10 minutes, more preferably at least 15 minutes, and less than 300 minutes, more preferably less than 60 minutes.

As already mentioned above, at least a part of the lignin, or more lignin, can be dissolved in the liquid during the heating up and the optionally conducted intermediate treatment of the liquid obtained in step b).

Without wanting to be bound to any theory, it is assumed that during the heating and the intermediate treatment optionally carried out a partial reaction of dissolved lignin with the cross-linking agent may take place too, wherein a modified dissolved lignin is obtained, where lignin reacts with the cross-linking agent, but the cross-linking by means of the cross-linking agent has not taken place or has taken place only partially. In other words, the molecule of the cross-linking agent can be bound to lignin at one location, but a second binding of the molecule to lignin with formation of the cross-linking is only partial, if at all.

By dissolved modified lignin is in particular to be understood that
- the aromatic compounds in the lignin are further mainly bound by ether linkages,
- the proportion of para-substituted phenolic rings in the whole proportion of aromatic rings is higher than 95%, preferably higher than 97%, in particular preferably 99%, and the content of free phenol is lower than 200 ppm, preferably lower than 100 ppm, moreover preferably lower than 75 ppm, in particular preferably lower than 50 ppm,
- the content of Klason lignin is at least 70%, preferably at least 75%, particularly preferably at least 80%, in particular at least 85%.

The content of free phenol is determined according to DIN ISO 8974. The content of Klason lignin is determined as acid-insoluble lignin according to TAPPI T 222. The quantification and qualification of the phenolic groups is determined by means of 31P-NMR according to M. Zawadzki, A. Ragauskas (Holzforschung 2001, 55, 3).

By the reaction of the cross-linking agent with the lignin dissolved in the liquid during heating and/or in the optional intermediate treatment, it is possible to warrant a higher selectivity of the reaction and to obtain, in a targeted way, a dissolved modified lignin that is than converted into cross-linked lignin particles in the hydrothermal treatment. By realizing the heating with the mentioned heating rates and/or the optional intermediate treatment of the liquid obtained in step b), the polymerization of the cross-linking agent with the lignin as well as possibly the carbonization products formed from the lignin are reduced or completely suppressed. By converting the modified dissolved lignin into a stabilized cross-linked lignin particle in the hydrothermal treatment, it is possible to influence the particle properties of the cross-linked or stabilized lignin particles in a targeted way. Thus, it is possible to adjust advantageous particle properties.

The temperature of the optional intermediate treatment advantageously is higher than 50° C., preferably higher than 60° C., particularly preferably higher than 70° C. and lower than 180° C., preferably lower than 150° C., further preferably lower than 130° C., particularly preferably lower than 100° C.

Advantageously, the average residence time in the optional intermediate treatment is at least 5 minutes, further preferably at least 10 minutes, further preferably at least 15 minutes, particularly preferably at least 30 minutes, in particular at least 45 minutes, however lower than 300 minutes.

An advantageous combination of time and temperature window for the optional intermediate treatment is a minimum temperature of 50° C. and a maximum temperature of less than 150° C., at a residence time of at least 15 minutes, preferably at least 20 minutes, further preferably at least 30 minutes, particularly preferably at least 45 minutes. An alternatively advantageous combination of time and temperature window for the optional intermediate treatment is a minimum temperature of 50° C. and a maximum temperature of less than 130° C., at a residence time of at least 10 minutes, preferably at least 15 minutes, further preferably at least 20 minutes, particularly preferably at least 30 minutes, in particular at least 45 minutes.

In a preferred embodiment of the optional intermediate treatment, a temperature from 50° C. to below 150° C. is held for a residence time of at least 20 min, preferably at least 60 min.

In another preferred embodiment of the optional intermediate treatment, a temperature from 70° C. to below 130° C. is held for a residence time of at least 10 min, preferably at least 50 min.

The optional intermediate treatment may be carried out at atmospheric pressure or at positive pressure, preferably at positive pressure.

Cross-Linked Lignin Particles I

A cross-linked lignin in particulate form is produced by the method according to the invention. Thus, the lignin obtained by the method according to the invention is present in the form of cross-linked lignin particles, wherein the final product obtained in the process preferably is a powder, in particular a dry powder. They are therefore solid particles that can be present dispersed in a liquid or as a dried or dry powder.

Preferably, the yield of cross-linked lignin particles relative to the employed lignin lies at more than 60%, preferably at more than 70%, particularly preferably at more than 80%, in particular at more than 85%.

The cross-linked lignin particles thus obtained are in particular stabilized lignin particles. The stabilization by cross-linking and hydrothermal treatment results in improved properties, e.g., increased specific surface area, reduced solubility in alkaline liquids and/or an increased glass transition point or no measurable glass transition point at all. The obtained cross-linked or stabilized lignin particles preferably exhibit a glass transition temperature of more than 160° C., preferably more than 180° C., particularly preferably more than 200° C., in particular more than 250° C. Preferably, no glass transition temperature at all can be measured in the cross-linked lignin particles obtained, i.e., there is no glass transition temperature.

Measurement of the glass transition temperature is carried out according to DIN 53765, after solid-liquid separation, washing and drying, on dried cross-linked lignin particles.

The stabilized lignin particles obtained by the method according to the invention have other advantageous particle properties that allow for their employment in material applications.

Preferably, the cross-linked lignin particles obtained by the method have a d50 value (volume average) of the particle size distribution of lower than 500 µm, preferably lower than 300 µm, further preferably lower than 200 µm, in particular lower than 100 µm, particularly preferably lower than 50 µm. Preferably, the d50 value (volume average) of the particle size distribution is higher than 0.5 µm, preferably higher than 1 µm, particularly preferably higher than 2 µm.

Measurement of the particle size distribution of the cross-linked or stabilized lignin is carried out in a suspension with distilled water by means of laser diffraction according to ISO 13320. Before and/or during measurement of the particle size distribution, the sample to be measured is dispersed by means of ultrasound until a particle size distribution is reached that remains stable over several measurements. This stability is reached if the individual measurements of a series of measurements, e.g., of the d50, do not differ from one another by more than 5%.

It is particularly preferably that the cross-linked lignin particles obtained have an STSA or an STSA surface area of at least 10 m$^2$/g, further preferably at least 20 m$^2$/g, more preferably at least 30 m$^2$/g, even more preferably at least 40 m$^2$/g, most preferably at least 50 m$^2$/g. Preferably, the STSA is less than 200 m$^2$/g, preferably less than 180 m$^2$/g. STSA (statistical thickness surface area) is a characterization of the outer surface area of the obtained lignin particles.

In a variant of the present cross-linked lignin particles, the STSA surface area exhibits values of at least 10 m$^2$/g to 180 m$^2$/g, preferably at least 20 m$^2$/g to 180 m$^2$/g, further preferably of 30 m$^2$/g to 180 m$^2$/g, particularly preferably of 40 m$^2$/g to 180 m$^2$/g.

Advantageously, the BET surface area of the present cross-linked or stabilized lignin differs only by at maximum 20%, preferably by at maximum 15%, further preferably by at maximum 10% from the STSA surface area. The BET surface area is determined as the total surface area from outer and inner surface area, by means of nitrogen adsorption according to Brunauer, Emmett and Teller.

Determination of the BET surface area and the STSA surface area is carried out according to the ASTM D 6556-14 standard. In contrast thereto, however, the sample preparation/outgassing for the measurement of STSA and BET is carried out at 150° C. in the present invention.

The cross-linked lignin particles produced in the method according to the invention preferably have an ash content of lower than 5% by mass, preferably lower than 3% by mass, and of more than 1% by mass.

Preferably, the obtained cross-linked lignin particle has only low porosity. Advantageously, the pore volume of the cross-linked or stabilized lignin is <0.1 cm$^3$/g, further preferably <0.01 cm$^3$/g, particularly preferably <0.005 cm$^3$/g. Thus, the present cross-linked or stabilized lignin differs from finely divided porous materials such as ground biogenic activated carbon powder, which, in addition to a BET surface area of usually more than 500 m$^2$/g, can also have an STSA surface area of at maximum 10 m$^2$/g.

The obtained cross-linked lignin particles differ from lignin-based resins that are generated by a reaction with formaldehyde and converted from the solution to a duromer via the gel state, in particular by the preferred advantageous particle properties, for example the d50 value of the particle size distribution of less than 500 µm or the STSA of more than 10 m$^2$/g, preferably more than 20 m$^2$/g.

Preferably, the obtained cross-linked lignin particles are soluble in alkaline liquids only conditionally. Preferably, the solubility of the undissolved stabilized lignin is lower than 30%, preferably lower than 25%, particularly preferably lower than 20%.

The alkaline solubility of the cross-linked or stabilized lignin particles is determined as follows:

1. The lignin particles are separated from the liquid by means of centrifugation or filtration and then washed with distilled water.
2. The product from 1 is dried at 105° C. for 24 hours.
3. To determine the solubility of a solid substance sample, it must be present in the form of a dry, fine powder (DS>98%). If this is not the case, the dry sample is ground or thoroughly mortared before determining the solubility.
4. The solubility is determined in triplicate. For this purpose, 4 g dry filler each are weighed into 80 g 0.1M NaOH into an Erlenmeyer flask with 100 ml, respectively.
5. The alkaline suspension is shaken at room temperature (23° C.) for 2 hours, at a shaker rate of 200 per minute. If the liquid should contact the lid in the process, the shaker rate has to be reduced to prevent this from happening.
6. The suspension is then transferred to a Büchner funnel with filter paper Ø=55 mm, 5-8 µm pore size—previously balanced to the nearest 0.1 mg on the analytical balance—as completely as possible and filtered under vacuum. The filter paper is slightly moistened under vacuum before filtration. After complete filtration, the pH value of the filtrate water is measured and noted. The Erlenmeyer flask is then rinsed with 40 ml of distilled water to transfer even the last remnants of any remaining material to the Buchner funnel, and at the same time to clean the filter cake of soluble substances such as the NaOH used. The filtration is continued until the filter cake is dry again.
7. After washing the filter cake, the Buchner funnel is dried in the drying oven for at least 24 h at 105° C. until the weight remains constant.
8. The alkaline solubility of the lignin-rich solid matter is calculated as follows:

Alkaline solubility of lignin-rich solid matter [%]=100%−X %, wherein X %=mass of the undissolved proportion after centrifugation or filtration and drying [g]×100/mass of the dry product obtained in pos. 2. above [g]

The invention further relates to cross-linked lignin particles that can be obtained by the method according to the invention, wherein the cross-linked lignin particles preferably exhibit an STSA surface area of at least 10 m$^2$/g, further preferably at least 20 m$^2$/g, more preferably at least 30 m$^2$/g, even more preferably at least 40 m$^2$/g, most preferably at least 50 m$^2$/g.

The lignin particles obtained by the method according to the invention preferably exhibit the following properties:

an STSA of at least 10 m²/g, preferably at least 20 m²/g, more preferably at least 30 m²/g, even more preferably at least 40 m²/g, most preferably at least 50 m²/g. Preferably the STSA is less than 200 m²/g, preferably less than 180 m²/g, a signal in the solid state $^{13}$C-NMR at 0 to 50 ppm, preferably at 10 to 40 ppm, particularly preferably at 25 to 35 ppm, having an intensity relative to the signal of the methoxy groups at 54 to 58 ppm of 1-80%, preferably 5-60%, in particular preferably 5-50%, and a $^{13}$C-NMR signal at 125 to 135 ppm, preferably at 127 to 133 ppm, that is increased in comparison to the lignin employed, a $^{14}$C content corresponding to that of regrowing raw materials, preferably greater than 0.20 Bq/g of carbon, particularly preferably greater than 0.23 Bq/g of carbon, but preferably less than 0.45 Bq/g of carbon, respectively;

a carbon content based on the ash-free dry substance of between 60% by weight and 80% by weight, preferably between 65% by weight and 75% by weight;

a glass transition temperature of more than 160° C., further preferably of more than 180° C., particularly preferably of more than 200° C., in particular of more than 250° C.

Preferably, no glass transition temperature can be measured for the cross-linked lignin particle.

a pore volume of the cross-linked or stabilized lignin of less than 0.1 cm³/g, further preferably less than 0.01 cm³/g, particularly preferably less than 0.005 cm³/g.

Cross-Linked Lignin Particles II

The invention further relates to cross-linked lignin particles that exhibit a glass transition temperature Tg of at least 160° C. or no glass transition temperature at all. Moreover, the cross-linked lignin particles have an STSA surface area of at least 10 m²/g. As already described above, the cross-linked lignin particles are lignin particles that are cross-linked with a cross-linking agent, wherein the possible cross-linking agents are those described above, in particular formaldehyde.

It is particularly preferred that the cross-linked lignin particles have an STSA or an STSA surface area of at least 20 m²/g, more preferably at least 30 m²/g, even more preferably at least 40 m²/g, most preferably at least 50 m²/g. Preferably, the STSA is less than 200 m²/g, preferably less than 180 m²/g. The cross-linked lignin particles may have an STSA surface area of, e.g., at least 10 m²/g to 180 m²/g, preferably at least 20 m²/g to 180 m²/g, further preferably of 30 m²/g to 180 m²/g, particularly preferably of 40 m²/g to 180 m²/g.

The cross-linked lignin particles preferably exhibit a glass transition temperature of more than 180° C., more preferably more than 200° C., in particular more than 250° C. Preferably, no glass transition temperature at all can be measured for the cross-linked lignin particles.

The cross-linked lignin particles are, inter alia, distinguished by a reduced solubility in alkaline liquids. In a preferred embodiment, the cross-linked lignin particles have an alkaline solubility in 0.1 M NaOH at 23° C. of less than 30%, preferably less than 25%, particularly preferably less than 20%. The alkaline solubility is determined according to the method described above.

In a preferred embodiment, the cross-linked lignin particles have a $^{14}$C content in a range from 0.20 to 0.45 Bq/g of carbon.

For the purpose of determining the $^{14}$C content, the material to be investigated was sent to the Poznań Radiocarbon Laboratory, Foundation of the A. Mickiewicz University, ul. Rubież 46, 61-612 Poznań. The method used is described by the director of the laboratory, Tomasz Goslar, on the Internet presence of the institute.

The contents relevant for lignin are summed up in the following: Procedure for $^{14}$C dating by means of the AMS technology with the steps of:

a) chemical pretreatment according to Brock et al., 2010, Radiocarbon, 52, 102-112.

b) production of $CO_2$ and graphitization c) measurement of $^{14}$C with the "Compact Carbon AMS" spectrometer according to Goslar T., Czernik J., Goslar E., 2004, Nuclear Instruments and Methods B, 223-224, 5-11 d) calculation and calibration of the $^{14}$C age (calculation according to Stuiver, Polach 1977, Radiocarbon 19, 355; calibration according to Bronk Ramsey C., 2001, Radiocarbon, 43, 355-363; Bronk Ramsey C., 2009, Radiocarbon, 51, 337-360; Bronk Ramsey C. and Lee S., 2013, Radiocarbon, 55, 720-730 and Reimer P. J., et al. 2013, Radiocarbon, 55(4), 1869-1887).

For archaeological purposes, the analysis gives the age of the carbon sample. The measurement results can however also be stated as the specific activity.

The cross-linked particles according to the invention can furthermore also exhibit all the other properties described above under "Cross-Linked Lignin Particles I", e.g., with regard to particle size distribution, ash content and/or pore volume, and so reference is made thereto.

According to one embodiment, the cross-linked lignin particles according to the invention may be functionalized, in particular silanized. This is to be understood as a modification of the surface of the cross-linked lignin particles with a coupling reagent. The coupling reagent presents a functional group through which a chemical binding to the surface of the cross-linked lignin particles is effected. By means of such functionalization, in particular silanization, it is in particular possible to achieve an improved binding, e.g., chemical binding to a polymer that serves as a matrix material, in particular a rubber elastomer.

Such coupling reagents or surface modification agents are known to the skilled person in the field of fillers. Suitable examples for coupling reagents are in particular organosilane, e.g., bis(trialkoxysilylalkyl)-oligo- or -polysulfide, mercaptosilanes, aminosilanes or silanes with unsaturated hydrocarbon groups, such as vinylsilanes.

The functionalisation or silanisation of the cross-linked lignin particles is carried out preferably ex situ, i.e., before the mixing with a polymer, in particular a rubber.

In a preferred embodiment, the cross-linked lignin particles are lignin particles that can be obtained by a method according to the invention, as described hereinabove.

Rubber Article, in Particular Technical Rubber Article or Tire, Containing Cross-Linked Lignin Particles The invention further relates to a rubber article, in particular a technical rubber article or tire, that contains cross-linked lignin particles as described hereinabove as a filler and at least one polymer, in particular a rubber elastomer, as the matrix or matrix material. It is known to the person skilled in the art that rubber articles may contain a variety of additives, such as, e.g., fillers.

The polymer contained as the matrix or matrix material in the rubber article is a rubber elastomer in particular. The rubber elastomer can be formed from one or more rubbers. The rubber elastomer can be formed from, e.g., natural rubber (1,4 polyisoprene), e.g., from the rubber tree "*Hevea brasiliensis*" or dandelion (*Taraxacum*), synthetic natural rubber and/or synthetic rubbers, or mixtures thereof, which is/are then converted into the rubber matrix by vulcanisation.

The cross-linked lignin according to the invention can then be employed in the rubber article, in particular in the technical rubber article or tire, e.g., in a quantity of 10% by weight to 150% by weight, preferably 20% by weight to 120% by weight, more preferably 40% by weight to 100% by weight, particularly preferably 50% by weight to 80% by weight, relative to the weight of the rubber employed for the rubber article.

Rubber articles, in particular technical rubber articles or tires, are articles based on rubber or a rubber elastomer, i.e., vulcanized rubber, that serves as the matrix material for the article. Rubber articles, especially technical rubber articles or tires, are sometimes also called rubber goods (Gummiwaren, Kautschukartikel or Kautschukwaren in German language). One of the technical terms for technical rubber articles in English is "Mechanical Rubber Goods" (abbreviated as MRG). Examples for rubber articles, in particular technical rubber articles or tires, are vehicle tires, sealing profiles, belts, bands, conveyor belts, hoses, spring elements, rubber-metal composite parts, roller linings, molded articles, rubber seals and cables.

In a preferred embodiment, the rubber article, in particular the technical rubber article or tire, may contain additional fillers, in particular carbon black and/or silicic acid and/or other inorganic or surface-treated inorganic fillers, such as, e.g., chalk and silica.

The cross-linked lignin particles contained in the rubber article, in particular the technical rubber article or tire, according to the invention are in particular cross-linked lignin particles according to the invention as described under "Cross-linked Lignin Particles II". Particularly preferably, the cross-linked lignin particles are obtainable by the method according to the invention as described hereinabove.

In the following, the invention will be described through exemplary embodiments that however should not be taken to limit the invention in any way.

EXEMPLARY EMBODIMENTS

In the following examples, BET is given instead of STSA. BET and STSA do however not differ from one another by more than 10% for the undissolved stabilized lignin produced herein. The lignin content of the raw material is given here by the raw material mass minus the water-free ash content.

Example 1 (Comparison)

The raw material is a lignin obtained from black liquor from kraft pulping by means of $CO_2$ precipitation. The water-free ash content of the raw material was determined to be 19.3%. By addition of water, the solid matter was converted into a liquid containing the dissolved lignin and having a dry substance content of 18.6% and a pH value of 10. The amounts of formaldehyde defined in Table 1, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 1. The undissolved stabilized lignin was recovered by filtration. After washing, with twice the amount of demineralized water relative to the recovered filtrate, and after drying in an air circulation drying cabinet, the yield noted in Table 1 was obtained. The yield was calculated relative to the used quantity of lignin raw material as dry substance. The used quantity of formaldehyde was not included in the calculation of yield. The specific surface area (BET) in Table 1 of the undissolved stabilized lignins was determined after baking-out at 150° C. in vacuo.

TABLE 1

Variants of the experiments from Example 1 with different additive concentrations

| No. | pH value | Conductivity [mScm$^{-1}$] | Cross-linking agent/raw material [g/100 g raw material] | Temperature [° C.] | Residence time at temperature [h] | Yield [undissolved stabilized lignin/raw material in %] | BET [m$^2$/g] |
|---|---|---|---|---|---|---|---|
| A | 10.0 | 26.8 | 0 | 240 | 6 | 59 | 7 |
| B | 10.0 | 26.8 | 4 | 240 | 6 | 70 | 0.4 |
| C | 10.0 | 26.8 | 8 | 240 | 6 | 72 | 0.7 |
| D | 10.0 | 26.8 | 16 | 240 | 6 | 78 | 2.5 |

Example 2

The raw material is a lignin obtained from black liquor from kraft pulping by means of $CO_2$ precipitation. The water-free ash content of the raw material was determined to be 19.3%. By addition of water and sulfuric acid, the solid matter was converted into a liquid containing the dissolved lignin and having a dry substance content of 19.1% and a pH value of 9. The amounts of formaldehyde defined in Table 2, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 2. The undissolved stabilized lignin was recovered by filtration. After washing, with twice the amount of demineralized water relative to the recovered filtrate, and after drying in an air circulation drying cabinet, the yield noted in Table 2 was obtained. The yield was calculated relative to the used quantity of lignin raw material as dry substance. The used quantity of formaldehyde was not included in the calculation of yield. The specific surface area (BET) in Table 2 of the undissolved stabilized lignins was determined after baking-out at 150° C. in vacuo.

TABLE 2

Variants of the experiments from Example 2 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 9.0 | 28.8 | 0 | 240 | 6 | 78 | 0.7 |
| B | 9.0 | 28.8 | 5 | 240 | 6 | 77 | 23 |
| C | 9.0 | 28.8 | 10 | 240 | 6 | 79 | 21 |
| D | 9.0 | 28.8 | 21 | 240 | 6 | 82 | 69 |

Example 3

The raw material is a lignin obtained from black liquor from kraft pulping by means of $CO_2$ precipitation. The water-free ash content of the raw material was determined to be 19.3%. By addition of water and sulfuric acid, the solid matter was converted into a liquid containing the dissolved lignin and having a dry substance content of 19.2% and a pH value of 8.8. The amounts of formaldehyde defined in Table 3, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 3. The undissolved stabilized lignin was recovered by filtration. After washing, with twice the amount of demineralized water relative to the recovered filtrate, and after drying in an air circulation drying cabinet, the yield noted in Table 3 was obtained. The yield was calculated relative to the used quantity of lignin raw material as dry substance. The used quantity of formaldehyde was not included in the calculation of yield. The specific surface area (BET) in Table 3 of the undissolved stabilized lignins was determined after baking-out at 150° C. in vacuo.

TABLE 3

Variants of the experiments from Example 3 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 8.8 | 29.6 | 0 | 240 | 6 | 61 | 0.7 |
| B | 8.8 | 29.6 | 5 | 240 | 6 | 72 | 47 |
| C | 8.8 | 29.6 | 10 | 240 | 6 | 75 | 49 |
| D | 8.8 | 29.6 | 20 | 240 | 6 | 83 | 60 |

Example 4 (Comparison)

The raw material is a lignin obtained from black liquor from kraft pulping by means of $CO_2$ precipitation. The water-free ash content of the raw material was determined to be 19.3%. By addition of water, the solid matter was converted into a liquid containing the dissolved lignin and having a dry substance content of 14.8% and a pH value of 10. The amounts of formaldehyde defined in Table 4, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 4. The undissolved stabilized lignin was recovered by filtration. After washing, with twice the amount of demineralized water relative to the recovered filtrate, and after drying in an air circulation drying cabinet, the yield noted in Table 4 was obtained. The yield was calculated relative to the used quantity of lignin raw material as dry substance. The used quantity of formaldehyde was not included in the calculation of yield. The specific surface area (BET) in Table 4 of the undissolved stabilized lignins was determined after baking-out at 150° C. in vacuo.

TABLE 4

Variants of the experiments from Example 4 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 10.0 | 24 | 0 | 240 | 6 | 55 | 6 |
| B | 10.0 | 24 | 4 | 240 | 6 | 65 | 0.2 |
| C | 10.0 | 24 | 8 | 240 | 6 | 70 | 0.4 |
| D | 10.0 | 24 | 16 | 240 | 6 | 76 | 0.4 |

Example 5

The raw material is a lignin obtained from black liquor from kraft pulping by means of $CO_2$ precipitation. The water-free ash content of the raw material was determined to be 19.3%. By addition of water and sulfuric acid, the solid matter was converted into a liquid containing the dissolved lignin and having a dry substance content of 15.3% and a pH value of 9.2. The amounts of formaldehyde defined in Table 5, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 5. The undissolved stabilized lignin was recovered by filtration. After washing, with twice the amount of demineralized water relative to the recovered filtrate, and after drying in an air circulation drying cabinet, the yield noted in Table 5 was obtained. The yield was calculated relative to the used quantity of lignin raw material as dry substance. The used quantity of formaldehyde was not included in the calculation of yield. The specific surface area (BET) in Table 5 of the undissolved stabilized lignins was determined after baking-out at 150° C. in vacuo.

TABLE 5

Variants of the experiments from Example 5 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 9.2 | 25.8 | 0 | 240 | 6 | 59 | 1.3 |
| B | 9.2 | 25.8 | 5 | 240 | 6 | 74 | 7 |
| C | 9.2 | 25.8 | 10 | 240 | 6 | 75 | 31 |
| D | 9.2 | 25.8 | 20 | 240 | 6 | 78 | 80 |

Example 6

The raw material is a lignin obtained from black liquor from kraft pulping by means of $CO_2$ precipitation. The water-free ash content of the raw material was determined to be 19.3%. By addition of water and sulfuric acid, the solid matter was converted into a liquid containing the dissolved lignin and having a dry substance content of 15.5% and a pH value of 8.5. The amounts of formaldehyde defined in Table 6, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 6. The undissolved stabilized lignin was recovered by filtration. After washing, with twice the amount of demineralized water relative to the recovered filtrate, and after drying in an air circulation drying cabinet, the yield noted in Table 6 was obtained. The yield was calculated relative to the used quantity of lignin raw material as dry substance. The used quantity of formaldehyde was not included in the calculation of yield. The specific surface area (BET) in Table 6 of the undissolved stabilized lignins was determined after baking-out at 150° C. in vacuo.

TABLE 6

Variants of the experiments from Example 6 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 8.5 | 26.5 | 0 | 240 | 6 | 58 | 1.0 |
| B | 8.5 | 26.5 | 5 | 240 | 6 | 70 | 61 |
| C | 8.5 | 26.5 | 10 | 240 | 6 | 77 | 59 |
| D | 8.5 | 26.5 | 20 | 240 | 6 | 77 | 71 |

Example 7 (Comparison)

The raw material is a lignin obtained from black liquor from kraft pulping by means of $CO_2$ precipitation. The water-free ash content of the raw material was determined to be 19.3%. By addition of water, the solid matter was converted into a liquid containing the dissolved lignin and having a dry substance content of 9.8% and a pH value of 10. The amounts of formaldehyde defined in Table 7, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 7. The undissolved stabilized lignin was recovered by filtration. After washing, with twice the amount of demineralized water relative to the recovered filtrate, and after drying in an air circulation drying cabinet, the yield noted in Table 7 was obtained. The yield was calculated relative to the used quantity of lignin raw material as dry substance. The used quantity of formaldehyde was not included in the calculation of yield. The specific surface area (BET) in Table 7 of the undissolved stabilized lignins was determined after baking-out at 150° C. in vacuo.

TABLE 7

Variants of the experiments from Example 7 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 10.0 | 18.6 | 0 | 240 | 6 | 50 | 25 |
| B | 10.0 | 18.6 | 5 | 240 | 6 | 66 | 0.3 |
| C | 10.0 | 18.6 | 10 | 240 | 6 | 69 | 0.4 |
| D | 10.0 | 18.6 | 20 | 240 | 6 | 75 | 0.3 |

Example 8

The raw material is a lignin obtained from black liquor from kraft pulping by means of $CO_2$ precipitation. The water-free ash content of the raw material was determined to be 19.3%. By addition of water and sulfuric acid, the solid matter was converted into a liquid containing the dissolved lignin and having a dry substance content of 9.4% and a pH value of 8.8. The amounts of formaldehyde defined in Table 8, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 8. The undissolved stabilized lignin was recovered by filtration. After washing, with twice the amount of demineralized water relative to the recovered filtrate, and after drying in an air circulation drying cabinet, the yield noted in Table 8 was obtained. The yield was calculated relative to the used quantity of lignin raw material as dry substance. The used quantity of formaldehyde was not included in the calculation of yield. The specific surface area (BET) in Table 8 of the undissolved stabilized lignins was determined after baking-out at 150° C. in vacuo.

TABLE 8

Variants of the experiments from Example 8 with different additive concentrations

| No. | pH value | Conductivity [mScm$^{-1}$] | Cross-linking agent/raw material [g/100 g raw material] | Temperature [° C.] | Residence time at temperature [h] | Yield [undissolved stabilized lignin/raw material in %] | BET [m$^2$/g] |
|---|---|---|---|---|---|---|---|
| A | 8.8 | 19.9 | 0 | 240 | 6 | 57 | 4 |
| B | 8.8 | 19.9 | 10 | 240 | 6 | 77 | 32 |
| C | 8.8 | 19.9 | 20 | 240 | 6 | 83 | 70 |

Example 9

The raw material is a lignin obtained from black liquor from kraft pulping by means of $CO_2$ precipitation. The water-free ash content of the raw material was determined to be 19.3%. By addition of water and sulfuric acid, the solid matter was converted into a liquid containing the dissolved lignin and having a dry substance content of 10.3% and a pH value of 8.6. The amounts of formaldehyde defined in Table 9, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 9. The undissolved stabilized lignin was recovered by filtration. After washing, with twice the amount of demineralized water relative to the recovered filtrate, and after drying in an air circulation drying cabinet, the yield noted in Table 9 was obtained. The yield was calculated relative to the used quantity of lignin raw material as dry substance. The used quantity of formaldehyde was not included in the calculation of yield. The specific surface area (BET) in Table 9 of the undissolved stabilized lignins was determined after baking-out at 150° C. in vacuo.

TABLE 9

Variants of the experiments from Example 9 with different additive concentrations

| No. | pH value | Conductivity [mScm$^{-1}$] | Cross-linking agent/raw material [g/100 g raw material] | Temperature [° C.] | Residence time at temperature [h] | Yield [undissolved stabilized lignin/raw material in %] | BET [m$^2$/g] |
|---|---|---|---|---|---|---|---|
| A | 8.6 | 20.4 | 0 | 240 | 6 | 51 | 2 |
| B | 8.6 | 20.4 | 5 | 240 | 6 | 63 | 69 |
| C | 8.6 | 20.4 | 10 | 240 | 6 | 77 | 85 |
| D | 8.6 | 20.4 | 20 | 240 | 6 | 80 | 83 |
| E | 8.6 | 20.4 | 0 | 240 | 2 | 54 | 3 |
| F | 8.6 | 20.4 | 10 | 240 | 2 | 80 | 21 |
| G | 8.6 | 20.4 | 20 | 240 | 2 | 82 | 52 |

Example 10

The raw material is a lignin obtained from black liquor from kraft pulping by means of $CO_2$ precipitation. The water-free ash content of the raw material was determined to be 19.3%. By addition of water and acetic acid, the solid matter was converted into a liquid containing the dissolved lignin and having a dry substance content of 10.4% and a pH value of 8.6. The amounts of formaldehyde defined in Table 10, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 10. The undissolved stabilized lignin was recovered by filtration. After washing, with twice the amount of demineralized water relative to the recovered filtrate, and after drying in an air circulation drying cabinet, the yield noted in Table 10 was obtained. The yield was calculated relative to the used quantity of lignin raw material as dry substance. The used quantity of formaldehyde was not included in the calculation of yield. The specific surface area (BET) in Table 10 of the undissolved stabilized lignins was determined after baking-out at 150° C. in vacuo.

TABLE 10

Variants of the experiments from Example 10 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 8.6 | 18.7 | 0 | 240 | 6 | 54 | 2 |
| B | 8.6 | 18.7 | 5 | 240 | 6 | 63 | 76 |
| C | 8.6 | 18.7 | 10 | 240 | 6 | 72 | 88 |
| D | 8.6 | 18.7 | 20 | 240 | 6 | 78 | 89 |

Example 11

The raw material is a lignin obtained from black liquor from kraft pulping by means of $CO_2$ precipitation. The water-free ash content of the raw material was determined to be 27.2%. By addition of water and sulfuric acid, the solid matter was converted into a liquid containing the dissolved lignin and having a dry substance content of 11.5% and a pH value of 8.7. The amounts of formaldehyde defined in Table 11, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 11. The undissolved stabilized lignin was recovered by filtration. After washing, with twice the amount of demineralized water relative to the recovered filtrate, and after drying in an air circulation drying cabinet, the yield noted in Table 11 was obtained. The yield was calculated relative to the used quantity of lignin raw material as dry substance. The used quantity of formaldehyde was not included in the calculation of yield. The specific surface area (BET) in Table 11 of the undissolved stabilized lignins was determined after baking-out at 150° C. in vacuo.

TABLE 11

Variants of the experiments from Example 11 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 8.7 | 27.6 | 0 | 240 | 6 | 52 | 1 |
| B | 8.7 | 27.6 | 5 | 240 | 6 | 65 | 76 |
| C | 8.7 | 27.6 | 10 | 240 | 6 | 69 | 74 |
| D | 8.7 | 27.6 | 20 | 240 | 6 | 72 | 81 |

Example 12

The raw material is a lignin obtained from black liquor from kraft pulping by means of $CO_2$ precipitation. The water-free ash content of the raw material was determined to be 21.2%. By addition of water and sulfuric acid, the solid matter was converted into a liquid containing the dissolved lignin and having a dry substance content of 10.6% and a pH value of 8.6. The amounts of formaldehyde defined in Table 12, in the form of a 23.5% formaldehyde solution, were respectively added to 30 g of this liquid containing dissolved lignin. The liquid containing the dissolved lignin and the formaldehyde solution were homogenized and hydrothermally treated for the times and at the temperatures given in Table 12. The undissolved stabilized lignin was recovered by filtration. After washing, with twice the amount of demineralized water relative to the recovered filtrate, and after drying in an air circulation drying cabinet, the yield noted in Table 12 was obtained. The yield was calculated relative to the used quantity of lignin raw material as dry substance. The used quantity of formaldehyde was not included in the calculation of yield. The specific surface area (BET) in Table 12 of the undissolved stabilized lignins was determined after baking-out at 150° C. in vacuo.

TABLE 12

Variants of the experiments from Example 12 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 8.6 | 21.6 | 0 | 240 | 6 | 51 | 2 |
| B | 8.6 | 21.6 | 5 | 240 | 6 | 61 | 67 |
| C | 8.6 | 21.6 | 10 | 240 | 6 | 67 | 63 |
| D | 8.6 | 21.6 | 20 | 240 | 6 | 72 | 72 |

Example 13

The raw material is a lignin obtained from black liquor from kraft pulping by means of $CO_2$ precipitation. The water-free ash content of the raw material was determined to be 19.3%. By addition of water and sulfuric acid, the solid matter was converted into a liquid containing the dissolved lignin and having a dry substance content of 10.1% and a pH value of 8.4. The amounts of formaldehyde defined in Table 13, in the form of a 23.5% formaldehyde solution, were respectively added to 700 g of this liquid containing dissolved lignin. The liquid containing the dissolved lignin and the formaldehyde solution were homogenized and hydrothermally treated for the times and at the temperatures given in Table 13. The undissolved stabilized lignin was recovered by filtration. After washing, with twice the amount of demineralized water relative to the recovered filtrate, and after drying in an air circulation drying cabinet, the yield noted in Table 13 was obtained. The yield was calculated relative to the used quantity of lignin raw material as dry substance. The used quantity of formaldehyde was not included in the calculation of yield. The specific surface area (BET) in Table 13 of the undissolved stabilized lignins was determined after baking-out at 150° C. in vacuo.

TABLE 13

Variants of the experiments from Example 13 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 8.4 | 19.4 | 8 | 240 | 6 | 65 | 20 |
| B | 8.4 | 19.4 | 10 | 240 | 6 | 54 | 15 |

Example 14

The raw material is a lignin obtained from black liquor from kraft pulping by means of $CO_2$ precipitation. The water-free ash content of the raw material was determined to be 19.3%. By addition of water and acetic acid, the solid matter was converted into a liquid containing the dissolved lignin and having a dry substance content of 10.1% and a pH value of 7.9. The amounts of formaldehyde defined in Table 14, in the form of a 23.5% formaldehyde solution, were respectively added to 700 g of this liquid containing dissolved lignin. The liquid containing the dissolved lignin and the formaldehyde solution were homogenized and hydrothermally treated for the times and at the temperatures given in Table 14. The undissolved stabilized lignin was recovered by filtration. After washing, with twice the amount of demineralized water relative to the recovered filtrate, and after drying in an air circulation drying cabinet, the yield noted in Table 14 was obtained. The yield was calculated relative to the used quantity of lignin raw material as dry substance. The used quantity of formaldehyde was not included in the calculation of yield. The specific surface area (BET) in Table 14 of the undissolved stabilized lignins was determined after baking-out at 150° C. in vacuo.

TABLE 14

Variants of the experiments from Example 14 with different additive concentrations

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 7.9 | 18.2 | 8 | 240 | 6 | 59 | 28 |
| B | 7.9 | 18.2 | 10 | 240 | 6 | 70 | 50 |

Example 15

The raw material is a lignin obtained from black liquor from kraft pulping by means of $CO_2$ precipitation. The water-free ash content of the raw material was determined to be 21.2%. By addition of water and sulfuric acid, the solid matter was converted into a liquid containing the dissolved lignin and having a dry substance content of 10.6% and a pH value of 8.6. The amounts of formaldehyde defined in Table 15, in the form of a 23.5% formaldehyde solution, were respectively added to 700 g of this liquid containing dissolved lignin. The liquid containing the dissolved lignin and the formaldehyde solution were homogenized and hydrothermally treated for the times and at the temperatures given in Table 15. The undissolved stabilized lignin was recovered by filtration. After washing, with twice the amount of demineralized water relative to the recovered filtrate, and after drying in an air circulation drying cabinet, the yield noted in Table 15 was obtained. The yield was calculated relative to the used quantity of lignin raw material as dry substance. The used quantity of formaldehyde was not included in the calculation of yield. The specific surface area (BET) in Table 15 of the undissolved stabilized lignins was determined after baking-out at 150° C. in vacuo.

TABLE 15

Variant of the experiments from Example 15

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 8.6 | 21.6 | 10 | 240 | 6 | 49 | 51 |

Example 16

The raw material is a lignin obtained from black liquor from kraft pulping by means of $CO_2$ precipitation. The water-free ash content of the raw material was determined to be 21.2%. By addition of water and sulfuric acid, the solid matter was converted into a liquid containing the dissolved lignin and having a dry substance content of 10.5% and a pH value of 7.1. The amounts of formaldehyde defined in Table 16, in the form of a 23.5% formaldehyde solution, were respectively added to 11600 g of this liquid containing dissolved lignin. The liquid containing the dissolved lignin and the formaldehyde solution were homogenized and hydrothermally treated for the times and at the temperatures given in Table 16. The undissolved stabilized lignin was recovered by filtration. After washing, with twice the amount of demineralized water relative to the recovered filtrate, and after drying in an air circulation drying cabinet, the yield noted in Table 16 was obtained. The yield was calculated relative to the used quantity of lignin raw material as dry substance. The used quantity of formaldehyde was not included in the calculation of yield. The specific surface area (BET) in Table 16 of the undissolved stabilized lignins was determined after baking-out at 150° C. in vacuo.

The alkaline solubility in 0.1 M NaOH of the undissolved stabilized lignin obtained was determined to be 9.1% according to the measuring method described above.

TABLE 16

Variant of the experiments from Example 16

| No. | pH value | Conductivity [mScm$^{-1}$] | Cross-linking agent/ raw material [g/100 g raw material] | Temperature [° C.] | Residence time at temperature [h] | Yield [undissolved stabilized lignin/ raw material in %] | BET [m$^2$/g] |
|---|---|---|---|---|---|---|---|
| A | 7.1 | 21.7 | 10 | 240 | 6 | 67 | 64 |

The invention claimed is:

1. A method for producing a cross-linked lignin in particulate form, wherein the method comprises the following steps:
(a) providing a black liquor with a dry matter content of 5 to 50% by weight,
(b) producing a liquid that contains lignin and at least one cross-linking agent and/or one precursor of the cross-linking agent and having the following properties:
a dry matter content of 5-25% by weight,
an ash content relative to the dry mass of 10-45% by weight,
a pH value of more than 6.5 and less than 10,
an electrical conductivity of more than 15 mS/cm to 400 mS/cm,
from the black liquor, wherein the production of the liquid comprises:
(i) mixing the black liquor with an acid and/or an acidic gas in order to lower the pH value, and
(ii) mixing the black liquor or a product derived therefrom with the at least one cross-linking agent and/or the precursor of the cross-linking agent, and
(iii) optionally adding a liquid in order to reduce the dry matter content,
(c) hydrothermal treatment of the liquid produced in step b) that contains lignin and at least one cross-linking agent and/or one precursor of the cross-linking agent at a temperature in a range from 150° C. to 270° C. with formation of cross-linked lignin particles in the liquid, and
(d) separating the liquid from the cross-linked lignin particles formed in step (c), and
(e) washing the separated cross-linked lignin particles with a washing medium.

2. The method according to claim 1, wherein the pH value of the liquid produced in step (b) is higher than 7.5 and lower than 10.

3. The method according to claim 1, wherein the liquid produced in step (b) that contains lignin and at least one cross-linking agent and/or one precursor of the cross-linking agent has an electrical conductivity of more than 25 mS/cm and/or has an electrical conductivity of at most 200 mS/cm.

4. The method according to claim 1, wherein, in the liquid produced in step (b), at least a part of the lignin is already dissolved in the liquid, and/or during the heating of the liquid produced in step (b) to the temperature for the hydrothermal treatment, at least a part of the lignin is dissolved in the liquid.

5. The method according to claim 1, wherein the at least one cross-linking agent is selected from aldehydes, epoxides, acid anhydrides, polyisocyanates or polyols, and/or the at least one precursor of the cross-linking agent is selected from compounds that form such cross-linking agent in situ.

6. The method according to claim 1, wherein an amount of the cross-linking agent in the liquid produced in step (b) is at maximum 4 mol of cross-linkable units per mole of the cross-linkable unit of the used lignin, and/or the amount of the cross-linking agent in the liquid produced in step (b) is at least 0.2 mol of cross-linkable units of the cross-linking agent per mole of units of the used lignin that are cross-linkable therewith, wherein in the case of additional or alternative use of the precursor of the cross-linking agent, an amount of the precursor is selected such that after in situ formation of the cross-linking agent such amounts are obtained.

7. The method according to claim 1, wherein the liquid produced in step (b) that contains lignin and at least one cross-linking agent and/or one precursor of the cross-linking agent is produced from the black liquor by:
(b1) mixing the black liquor with (i) an acid and/or an acidic gas in order to lower the pH value, and (ii) with the at least one cross-linking agent and/or the precursor of the cross-linking agent, or
(b2) mixing the black liquor with an acid and/or an acidic gas in order to lower the pH value, with formation of a solid lignin raw material in the black liquor; separating the solid lignin raw material from the black liquor; mixing the separated solid lignin raw material with (i) a liquid and (ii) with the at least one cross-linking agent and/or the precursor of the cross-linking agent; wherein optionally an acid and/or an acidic gas is admixed for further lowering of the pH value.

8. The method according to claim 7, wherein:
the pH value of the liquid produced in step (b) is in the range from 8 to 9.5, and/or
wherein in step (b2) an acid is added in a quantity of 2 to 15 g per 100 g of lignin for further lowering of the pH value.

9. The method according to claim 1, wherein:
the acid for the admixture in step (i) is selected from sulfuric acid or acetic acid or formic acid, and/or
the acidic gas for the admixture in step (i) is selected from $CO_2$, $H_2S$ or a mixture of $CO_2$ and $H_2S$.

10. The method according to claim 1, wherein the hydrothermal treatment is carried out at a temperature in a range from 180° C. to 250° C. and/or wherein the hydrothermal treatment is carried out at less than 270° C.

11. The method according to claim 1, wherein a duration of the hydrothermal treatment is at least 10 minutes, and/or less than 600 minutes.

12. The method according to claim 1, wherein an amount of lignin in the liquid produced in step (b) is in a range from 4 to 20% by weight, with respect to a total weight of the liquid without the at least one cross-linking agent and/or the precursor of the cross-linking agent.

13. The method according to claim 1, wherein an amount of cross-linking agent, in the liquid produced in step (b) is at maximum 35 g/100 g of lignin, wherein the amount of cross-linking agent, is in a range from 1 to 20 g/100 g of lignin.

14. The method according to claim 1, wherein:
before the hydrothermal treatment conducted in step (c), the liquid produced in step (b) is held at a temperature in a range from 50° C. to below 150° C., for a duration of at least 5 minutes, and less than 300 minutes, and/or, in order to reach the temperature for the hydrothermal treatment and/or the optionally conducted intermediate treatment, the liquid produced in step (b) is heated with a heating rate of less than 15 Kelvin per minute.

15. The method according to claim 1, wherein:
the washing medium used in step (e) for washing the cross-linked lignin particles has a pH value of more than 4, and/or the washing medium used in step (e) for washing the cross-linked lignin particles comprises or is water.

16. The method according to claim 1, wherein the cross-linked lignin particles produced in the method have an statistical thickness surface area (STSA) of at least 10 m$^2$/g, wherein the STSA is not higher than 180 m$^2$/g.

17. The method according to claim 1, wherein the cross-linked lignin particles produced in the method have an ash content of less than 5% by mass.

18. The method according to claim 1, wherein the black liquor provided in step (a) is taken from an evaporating plant for black liquor, and the liquid separated in step (d), and optionally the used washing medium obtained in step (e), are returned to the evaporating plant at a position that is downstream of the extraction point of the black liquor.

19. Cross-linked lignin particles, obtainable by a method according to claim 1, wherein the cross-linked lignin particles has statistical thickness surface area (STSA) of at least 10 m$^2$/g.

20. Cross-linked lignin particles having a glass transition temperature Tg of at least 160° C. or no glass transition temperature at all, and a statistical thickness surface area (STSA) of at least 10 m$^2$/g.

21. The cross-linked lignin particles according to claim 20, comprising an alkaline solubility in 0.1 M NaOH at 23° C. of less than 30%.

22. The cross-linked lignin particles according to claim 20, comprising a 14° C. content in a range from 0.20 to 0.45 Bq/g of carbon.

23. The cross-linked lignin particles according to claim 20, wherein they are functionalized before mixing with a polymer.

24. The cross-linked lignin particles according to claim 20 having a glass transition temperature of more than 180° C., or no glass transition temperature at all.

25. Cross-linked lignin particles according to obtainable by a method according to claim 1, wherein the cross-linked lignin particles have a glass transition temperature Tg of at least 160° C. or no glass transition temperature at all, and a statistical thickness surface area (STSA) of at least 10 m$^2$/g.

26. A rubber article comprising cross-linked lignin particles as filler and at least one polymer as matrix material selected from the group consisting of: a natural rubber elastomer, a synthetic natural rubber, and/or synthetic rubbers.

27. The rubber article according to claim 26, comprising additional fillers.

28. The rubber article according to claim 26, wherein the cross-linked lignin material has a statistical thickness surface area (STSA) of at least 10 m$^2$/g.

* * * * *